(12) United States Patent
Fleming

(10) Patent No.: US 8,056,107 B2
(45) Date of Patent: Nov. 8, 2011

(54) FRAME SCATTERING FOR VIDEO SCRUBBING

(75) Inventor: Hayden Graham Fleming, Ryde (AU)

(73) Assignee: Canon Kabushiki Kaisha, Tokyo (JP)

( * ) Notice: Subject to any disclaimer, the term of this patent is extended or adjusted under 35 U.S.C. 154(b) by 900 days.

(21) Appl. No.: 11/443,149

(22) Filed: May 31, 2006

(65) Prior Publication Data

US 2006/0288392 A1 Dec. 21, 2006

(30) Foreign Application Priority Data

May 31, 2005 (AU) ................................ 2005202356

(51) Int. Cl.
*G02B 25/00* (2006.01)
*H04N 7/173* (2011.01)

(52) U.S. Cl. ........................... 725/88; 725/142; 386/200

(58) Field of Classification Search .............. 725/88–90, 725/102; 715/833
See application file for complete search history.

(56) References Cited

U.S. PATENT DOCUMENTS

| | | | | |
|---|---|---|---|---|
| 5,732,217 | A * | 3/1998 | Emura .............................. | 725/90 |
| 5,828,370 | A * | 10/1998 | Moeller et al. .................. | 715/720 |
| 7,313,808 | B1 * | 12/2007 | Gupta et al. .................... | 725/89 |
| 2002/0003575 | A1 * | 1/2002 | Marchese ....................... | 348/231 |
| 2002/0075572 | A1 * | 6/2002 | Boreczky et al. ............. | 359/722 |
| 2003/0221196 | A1 * | 11/2003 | Connelly ....................... | 725/110 |
| 2005/0034148 | A1 * | 2/2005 | Jaeger ............................ | 725/14 |
| 2006/0156219 | A1 * | 7/2006 | Haot et al. .................. | 715/500.1 |

FOREIGN PATENT DOCUMENTS

WO  WO 00/65834  11/2000

OTHER PUBLICATIONS

Andreas Girgensohn and John Boreczky, "Time-Constrained Keyframe Selection Technique" in Multimedia Tools and Applications, Aug. 2000, Kluwer Academic Publishers, vol. 11, Issue 3, pp. 347-358.*

* cited by examiner

*Primary Examiner* — Andrew Koenig
*Assistant Examiner* — Carmine Malangone
(74) *Attorney, Agent, or Firm* — Fitzpatrick, Cella, Harper & Scinto

(57) ABSTRACT

Disclosed is a method of retrieving video frames over a network for subsequent display. A user interaction (303) with a timeline (202) represented by a client (103) coupled to the network (105) is detected. From the detected interaction, a request (304) for video to be retrieved from a server (101) across the network is formed. A series of non-contiguous (scattered) sample frames (FIGS. 13-16) received in response to the request are then cached (104) for subsequent display. This method permits efficient handling of video scrubbing requests for streamlining video as only selected ones of the cached sample frames close to a GUI play head position (203) need be reproduced. Since the frames are non-contiguous, the scope of the source video is quickly sampled permitting improved user response and, where desired, adjustment of the play head position.

20 Claims, 11 Drawing Sheets

| Field | Description |
|---|---|
| blob_length | Contains the length of this blob. The length includes the size of this field |
| blob_type | The type of this blob. This value is always VIDEO_BLOB for this blob type. |
| frame_time | The time of the following frame. |
| frame | A frame of video. |

Fig. 8

| Field | Description |
|---|---|
| blob_length | Contains the length of this blob. The length includes the size of this field. |
| blob_type | The type of this blob. This value is always NO_VIDEO_BLOB for this blob type. |
| start_time | The start time of the period of no video. |
| end_time | The end time of the period of no video |

Fig. 9

| Field | Description |
|---|---|
| blob_length | Contains the length of this blob. The length includes the size of this field. |
| blob_type | The type of this blob. This value is always EXPIRE_BLOB for this blob type. |
| frame_time | The time of the frame that is being expired from the clients cache by the server |

Fig. 10

FRAME SCATTERING FOR VIDEO SCRUBBING

CROSS-REFERENCE TO RELATED PATENT APPLICATIONS

This application claims the right of priority under 35 U.S.C. §119 based on Australian Patent Application No. 2005202356, filed May 31, 2005, which is incorporated by reference herein in its entirety as if fully set forth herein.

FIELD OF THE INVENTION

The present invention relates to network video streaming and, in particular, to low latency video scrubbing.

BACKGROUND

The field of network video streaming is steadily growing. The prevalence and increasing speed of networks has made viewing of video data interactively over a network increasingly feasible. By storing video on a central server and allowing access to the video via a streaming server to streaming clients, video can be accessed by a number of people simultaneously across a wide physical area. Video streaming is commonly used for accessing video data such as movie trailers, but can also be used for other networked arrangements such as digital video surveillance systems.

Video streaming protocols usually have a set of commands much akin to those traditionally used with video cassette recorders (VCRs). Common commands are: play from the beginning of the video or from a point in time, fast forward, rewind and pause. Some streaming server implementations also have non-VCR like commands such as reposition, which allows the streaming client to change the current play time of the streaming video without issuing another play request with the new time. Each command has a delay between when the streaming client issues the command until the effects of the command reach the streaming client. For instance there is a delay between issuing a play command and the video starting to arrive at the client.

Most video streaming clients have some form of timeline present in their user interface. The timeline serves two purposes in the client's user interface. Firstly the timeline has an indicator to show the current position within the video stream that is being displayed. The indicator is commonly called the "play head". Secondly the timeline allows the user to quickly jump to a position within the video stream either by clicking on the timeline or dragging the play head to a different position on the timeline. This process of dragging the play head to a different position is commonly called video scrubbing or scrubbing the play head.

The solution traditionally used is for the client to reposition or restart the video stream when the user has released the play head. In such implementations, the client generally handles the updating of the play head in a way that consumes significant server resources and which introduces a significant delay between the user's action and the updating of the video window. The process is also entirely reactive in that the client does nothing to anticipate future user actions.

SUMMARY OF THE INVENTION

It is an object of the present invention to substantially overcome or at least ameliorate one or more problems of existing arrangements.

In accordance with one aspect of the present invention there is disclosed a method of retrieving video frames over a network for subsequent display, said method comprising the steps of:

detecting user interaction with a timeline represented by a client coupled to said network;

from the detected interaction, forming a request for video to be retrieved from a server across said network; and caching for subsequent display a series of non-contiguous sample frames received in response to said request.

In accordance with another aspect of the present invention there is disclosed a client application for displaying video frames retrieved over a network from a server, said client application comprising:

a graphical user interface including a reproduction portion for display of said video frames and a timeline incorporating a play position of a currently displayed frame relative to a source of the video frames accessible via the server;

means for detecting a determinable user interaction with at least one of said timeline and said play position and, during said interaction, for:

(i) forming a scrubbing request for video to be supplied from the server according to at least a minimum granularity of said timeline;

(ii) communicating said scrubbing request to the server;

(iii) receiving non-contiguous sample frames from the server in response to the scrubbing request; and (iv) displaying at least one of said received sample frames in the display portion.

In accordance with another aspect of the present invention there is disclosed a server application for delivering video frames over a network to a client, said server application comprising:

means for receiving a scrubbing request for video from the client;

means for examining parameters of said scrubbing request;

means for selecting a series of non-contiguous sample frames from a video source according to said parameters; and means for transmitting said sample frames to the client.

Other aspects of the present invention are also disclosed.

BRIEF DESCRIPTION OF THE DRAWINGS

At least one embodiment of the present invention will now be described with reference to the drawings, in which:

FIGS. 8, 9 and 10 are tables of various filed descriptions used in the system of FIG. 1;

DETAILED DESCRIPTION INCLUDING BEST MODE

1.0 System Overview

Figure 1:
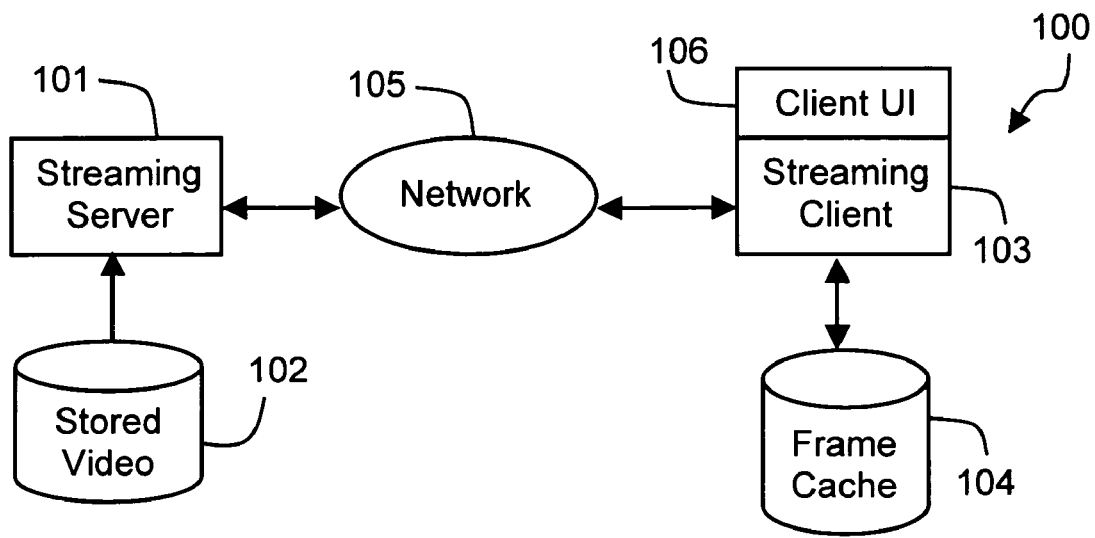
FIG. 1 is a schematic block diagram representation arrangement of a digital video streaming system.

FIG. 1 shows a system 100 for streaming digital video. A streaming server 101 has access to stored video 102 and is arranged to communicate with a streaming client 103. The streaming client 103 has an associated user interface (UI) 106 that is typically implemented as a graphical user interface (GUI) and which can display the streaming video. The streaming client 103 also has a frame cache 104 adapted to store video frames that are sent for viewing from the streaming server 101. The cache 104 may be used as a temporary store of video frames which may be subsequently displayed by the client 103, for example via the GUI 106 as a consequence of a user interaction with the GUI 106. The streaming client 103 and streaming server 101 are connected for communication by a network 105 which operates using a protocol, such as TCP/IP.

Figure 16:
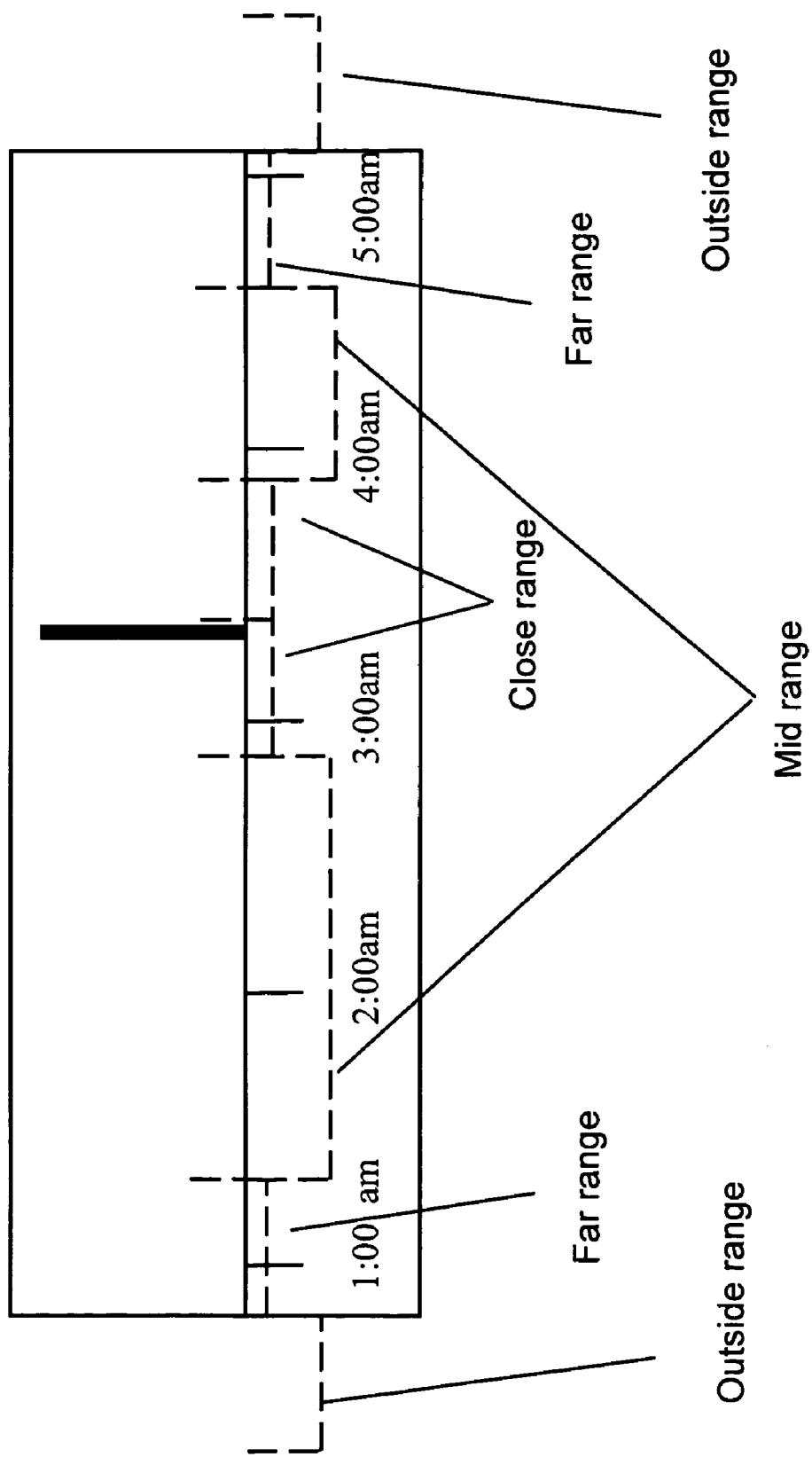
Figure 17:
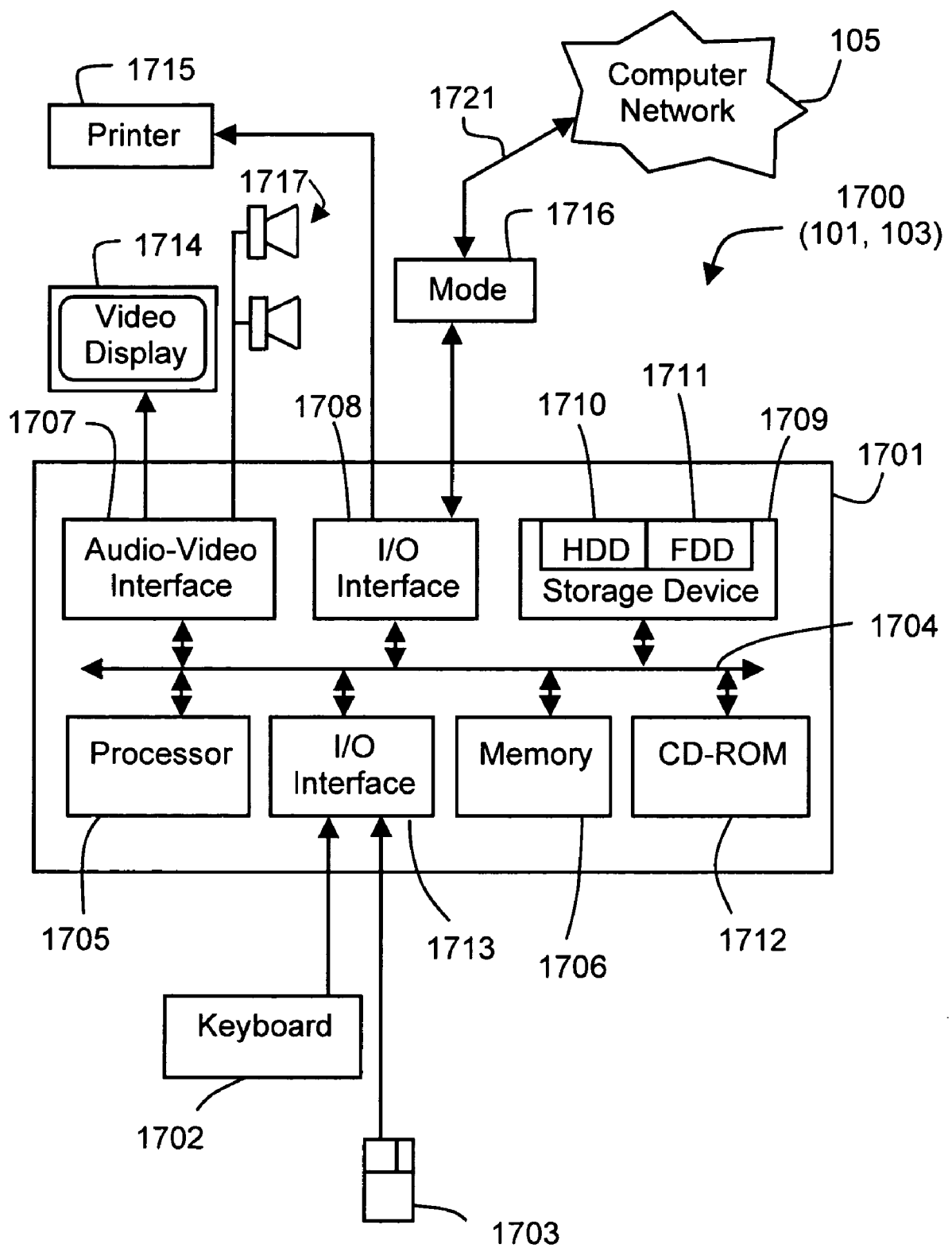
FIG. 17 is a schematic block diagram representation of a computer system that may be used in the system of FIG. 1.

The methods of video streaming described herein are preferably practiced using a general-purpose computer system 1700, such as that shown in FIG. 17, which may be used to implement an instance of the streaming server 101 or an instance of the streaming client 103, or both. The methods and processes of FIGS. 2 to 16 to be described may be implemented as software, such as one or more application programs executing within the computer system 1700. In particular, the steps of video streaming are effected by instructions in the software that are carried out by the computer. The instructions may be formed as one or more code modules, each for performing one or more particular tasks. The software may also be divided into two separate parts, in which a first part performs the streaming methods and a second part manages an appropriate user interface between the first part and the user, for example the client UI 106 when implemented on the client computer 103. The software may be stored in a computer readable medium, including the storage devices described below, for example. The software is loaded into the computer from the computer readable medium, and then executed by the computer. A computer readable medium having such software or computer program recorded on it is a computer program product. The use of the computer program product in the computer preferably effects an advantageous apparatus for video streaming.

The computer system 1700 is formed by a computer module 1701, input devices such as a keyboard 1702 and mouse 1703, output devices including a printer 1715, a display device 1714 and loudspeakers 1717. A Modulator-Demodulator (Modem) transceiver device 1716 is used by the computer module 1701 for communicating to and from the communications network 105, for example connectable via a telephone line 1721 or other functional medium. The modem 1716 can be used to obtain access to the Internet, and other network systems, such as a Local Area Network (LAN) or a Wide Area Network (WAN), and may be incorporated into the computer module 1701 in some implementations.

The computer module 1701 typically includes at least one processor unit 1705, and a memory unit 1706, for example formed from semiconductor random access memory (RAM) and read only memory (ROM). The frame cache for example is preferably implemented in the RAM 1706. The module 1701 also includes an number of input/output (I/O) interfaces including an audio-video interface 1707 that couples to the video display 1714 and loudspeakers 1717, an I/O interface 1713 for the keyboard 1702 and mouse 1703 and optionally a joystick (not illustrated), and an interface 1708 for the modem 1716 and printer 1715. In some implementations, the modem 17116 may be incorporated within the computer module 1701, for example within the interface 1708. A storage device 1709 is provided and typically includes a hard disk drive 1710 and a floppy disk drive 1711. A magnetic tape drive (not illustrated) may also be used. A CD-ROM drive 1712 is typically provided as a non-volatile source of data. For example, the stored video 102 may be retained in one or a combination of the CD-ROM 1712 or HDD 1710. The components 1705 to 1713 of the computer module 1701, typically communicate via an interconnected bus 1704 and in a manner which results in a conventional mode of operation of the computer system 1700 known to those in the relevant art. Examples of computers on which the described arrangements can be practiced include IBM-PC's and compatibles, Sun Sparestations or alike computer systems evolved therefrom.

Typically, the application programs are resident on the hard disk drive 1710 and read and controlled in their execution by the processor 1705. Intermediate storage of the program and any data fetched from the network 1720 may be accomplished using the semiconductor memory 1706, possibly in concert with the hard disk drive 1710. In some instances, the application program may be supplied to the user encoded on a CD-ROM or floppy disk and read via the corresponding drive 1712 or 1711, or alternatively may be read by the user from the network 1720 via the modem device 1716. Still further, the software can also be loaded into the computer system 1700 from other computer readable media. The term "computer readable storage medium" as used herein refers to any storage medium that participates in providing instructions and/or data to the computer system 1700 for execution and/or processing. Examples of storage media include floppy disks, magnetic tape, CD-ROM, a hard disk drive, a ROM or integrated circuit, a magneto-optical disk, or a computer readable card such as a PCMCIA card and the like, whether or not such devices are internal or external of the computer module 1701. Examples of computer readable transmission media that may also participate in providing instructions and data to the computer system 1700 may include radio or infra-red transmission channels as well as a network connection to another computer or networked device, and the Internet or Intranets including e-mail transmissions and information recorded on Websites and the like.

Parts of the video streaming methods may be implemented in dedicated hardware such as one or more integrated circuits configured to perform the streaming functions. Such dedicated hardware may include graphic processors, digital signal processors, or one or more microprocessors and associated memories.

2.0 Streaming Client Description

Figure 2:
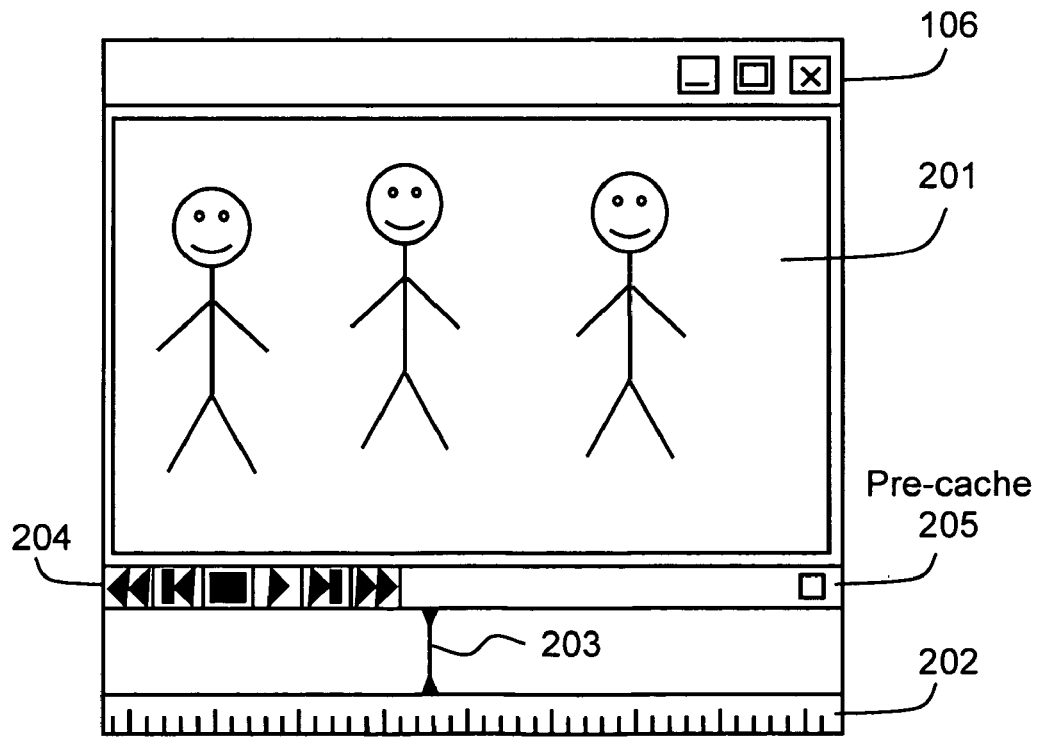
FIG. 2 is a representation of a digital video graphical user interface.

An example of the user interface 106 for the streaming client 103 is shown in FIG. 2, which is displayed as a window via the display 1714 of the client computer 103. The user interface 106 has four main parts, the first of which is a video presentation window 201 which displays the stream of video frames, for example as they arrive from the streaming server 101 via the network 105, or subsequent to storage in the frame cache 104. The GUI 106 also displays a timeline 202 which displays a time scale of the video content being streamed. The timeline 202 can typically be selected by the user operating the mouse 1703 and scrolled left into the past and scrolled right up to the present time. The range the timeline currently displays is known as the visible range of the timeline. In some implementations the timeline 202 has a fixed visible range that covers all of the available video. Arranged upon and forming part of the timeline 202 is a play head representation 203 which shows the time of the current video frame by moving across the timeline 202. The play head 203 is selectable, using the associated mouse 1703 for example, to also allow a user of the GUI 106 to interact with the timeline 202 to quickly move around the video content by dragging the play head 203 to a different position on the timeline 202. The GUI 106 also has a number of iconic controls 204 permitting further user interaction for modifying reproduction of the video stream within the window 201 in a manner similar to know VCR control operations.

Figure 3:
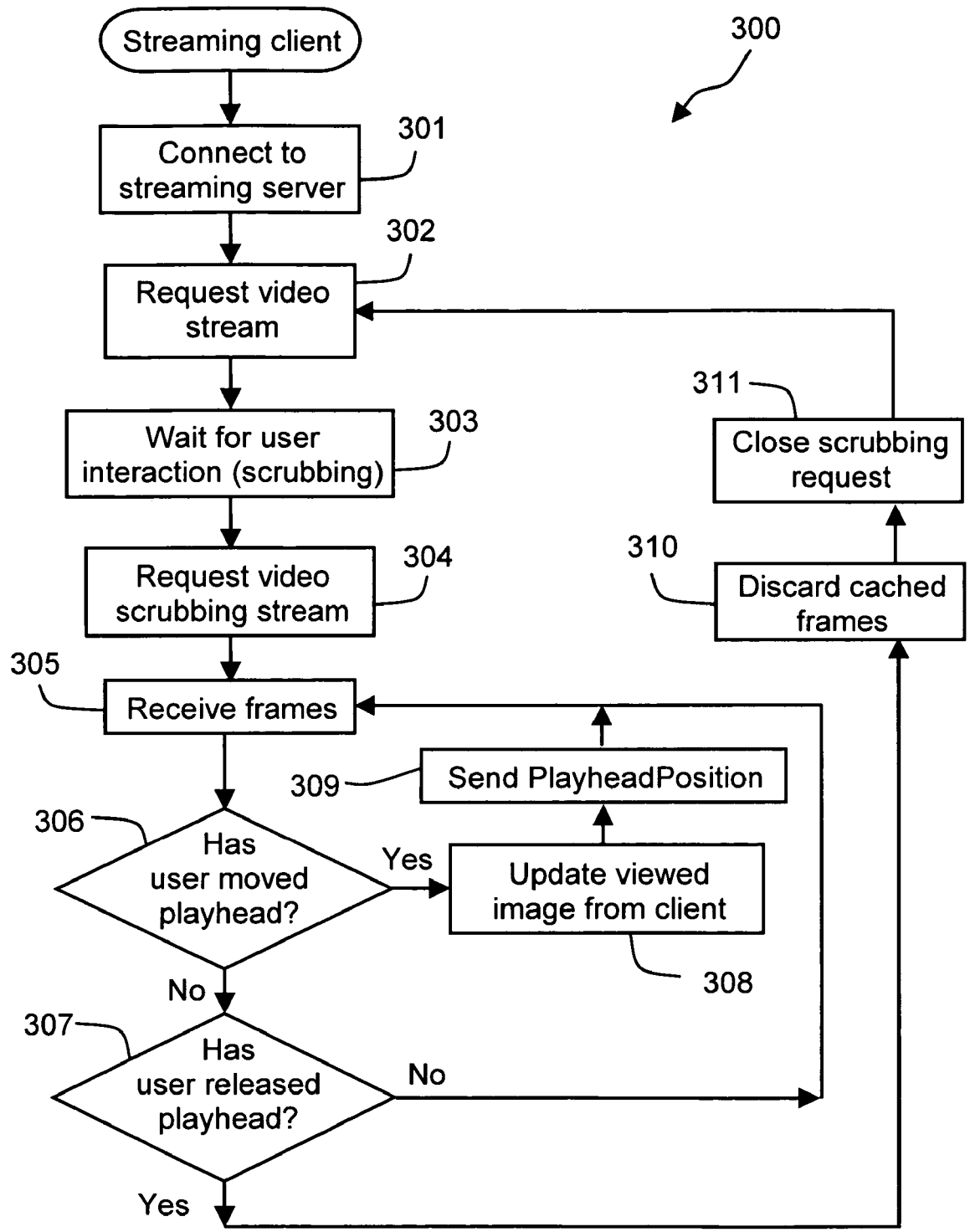
FIG. 3 is a flowchart of a method performed in a client computer of the system of FIG. 1.

FIG. 3 shows a method 300 implemented as software and executable by the streaming client 103 for reproduction of streaming video. At an initial step 301, the streaming client 103 forms a connection to the streaming server 101 over the network 105 using the TCP/IP protocol. Next at step 302 the streaming client 103 will typically issue a request for a video stream from the streaming server 101 using the protocol specified below. In response to this request, the streaming server 101 delivers the streamed video content to the client 103 which is reproduced using the GUI 106 as described above, thereby effecting a retrieval of the video content. As the client 103 receives the video, the client 103 updates the current time of the play head 203 so that it is synchronised with the time associated with the currently displayed video frame. Reproduction of the video stream continues in this fashion and according to traditional reproduction operation, including manipulation of the controls 204 and consequential responses thereto, until step 303 when the streaming client 103 detects a user interaction such as a clicking and holding the play head 203, this particular interaction being interpreted in the preferred implementation as a scrubbing operation.

When such a scrubbing operation is instigated and detected, at step 304 the streaming client 103 sends a GetScrubbingVideo request to the streaming server 101. The GetScrubbingVideo request includes the times representing the bounds of the currently visible timeline 202, the current (time) position of the play head 203 and the minimum granularity of the timeline 202

This minimum granularity of the timeline 202 specifies the minimum distance between times discernable in the streaming client 103. Two frames that are closer than this time can not be distinguished between by the user. A typical example of this is the time represented by one pixel in the presentation of the timeline 202 of the GUI 106. The user is not able to move the play head 203 less than one pixel by dragging and dropping. Further, interpreting this time to require the sending of more than one frame by the streaming server 101 in this time is not efficient. This parameter is typically specified in milliseconds and the value is dependent on the screen resolution and zoom level of the timeline being displayed. If not specified the streaming server 101 assumes that all frames can be individually distinguished, thereby permitting selection by the user of any one particular frame of the stream.

At step 305 the streaming client 103 reads the frames sent by the streaming server 101 and stores them in the frame cache 104 indexed by frame time. As noted above, the cache 104 is typically formed in a memory cache such as the semiconductor RAM 1706, but in some implementations the cache 104 may be formed in secondary storage, such as the HDD 1710. At step 306 the streaming client 103 checks if the user has moved the play head 203 by dragging and dropping or via the controls 204 since the previous occasion when the position of the play head 203 had been checked (ie. in step 303). If the play head 203 is detected as having been moved then, at step 308, the streaming client 103 checks the frame cache 104 for the temporally closest frame to the new play head time. If this is different from the currently displayed frame, then the currently displayed frame is removed from the video window 201 and the newly chosen frame reproduced in its place. In this fashion, and during the scrubbing operation, non-contiguous frames of the same video source are stored in the cache 104 and selectively reproduced via the window 201 on the display 1714. The method 300 then proceeds to step 309 the client 103 sends a PlayheadPosition command to the streaming server 101 to update parameters used by an algorithm implemented by the streaming server 101 to calculate the spread of frames to be sent. In some implementations the total time covered by the visible part of the timeline 202 may change during a single GetScrubbingVideo request.

If at step 306 the user had not moved the play head 203, then the process 300 continues at step 307 where the streaming client 103 checks to determine if the user has released the associated mouse 1703 (ie. de-selected the play head 203), thus indicating an end of the scrubbing request. If the user has released the associated mouse 1703, then at step 310 the streaming client 103 discards all frames from the frame cache 104. At step 311 the streaming client 103 then closes the scrubbing request to the streaming server 101. The client 103 then outputs a new streaming video request to the server 101 using the position the user released the play head 203 as the start time.

In some implementations the client 103 does not discard cached frames at step 310. The frames may remain cached by the client 103 for the next time the user initiates a video scrubbing request. The client 103 may discard frames at any time after the connection is closed.

3.0 Streaming Server Description

Figure 4:
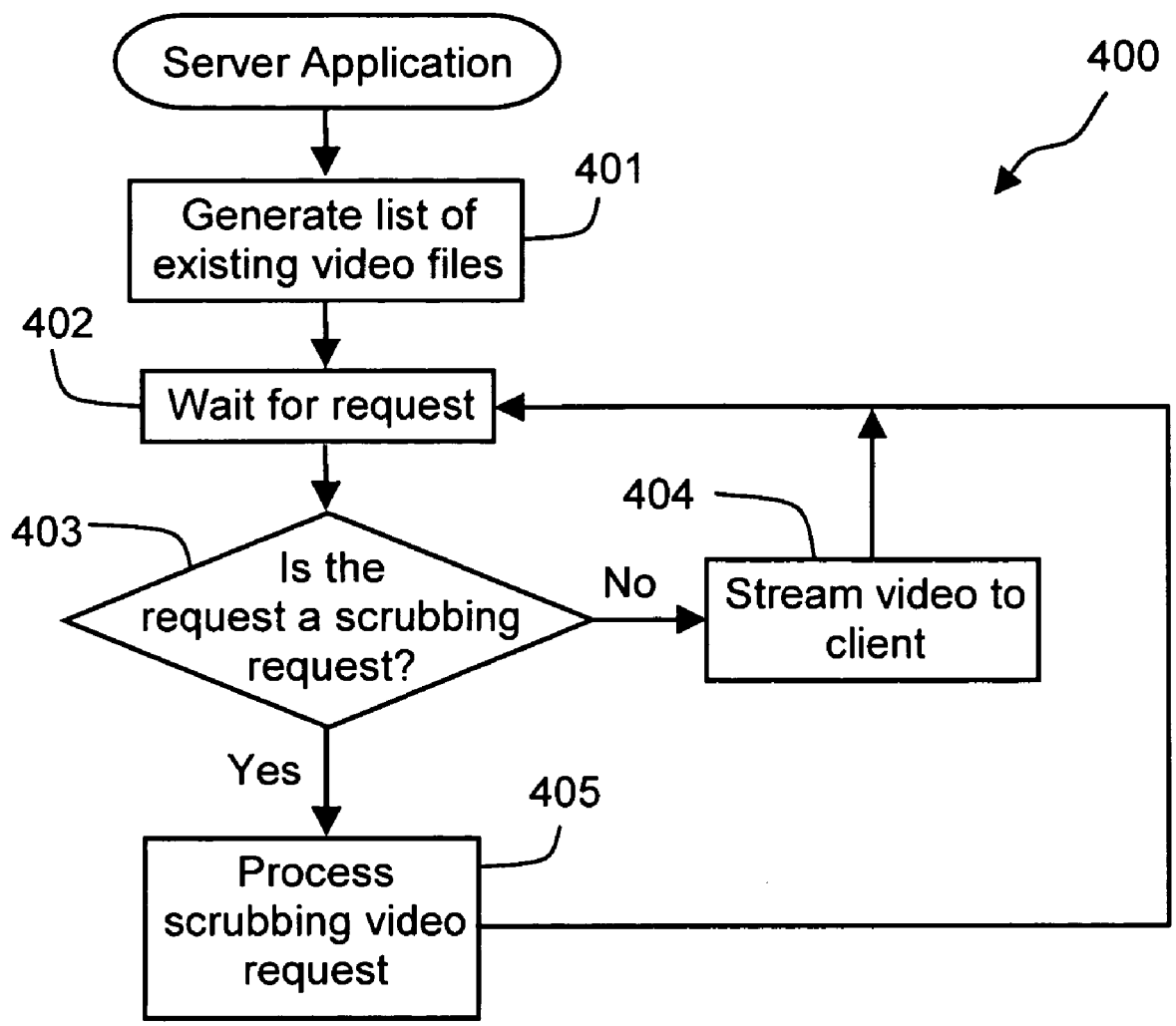
FIG. 4 is a flowchart of a method performed by a server computer in the system of FIG. 1.

A process 400 for operation of the streaming server 101 is shown in FIG. 4. The process 400 is desirably implemented as a software application executing within the streaming server 101. At step 401 the streaming server application 400 generates a list of video files that is available to stream to one or more streaming clients 103, for example from the store 102. At step 402 the streaming server 101 waits for a request from a streaming client 103. Step 403 is operative when a request has arrived to determine the type of the request. If the video request is a normal video request, then that request is processed in the usual manner according to traditional streaming applications, according to step 404. If the video request is a scrubbing video request, then the scrubbing request is handled at step 405 which is described in more detail in FIG. 5.

Figure 5:
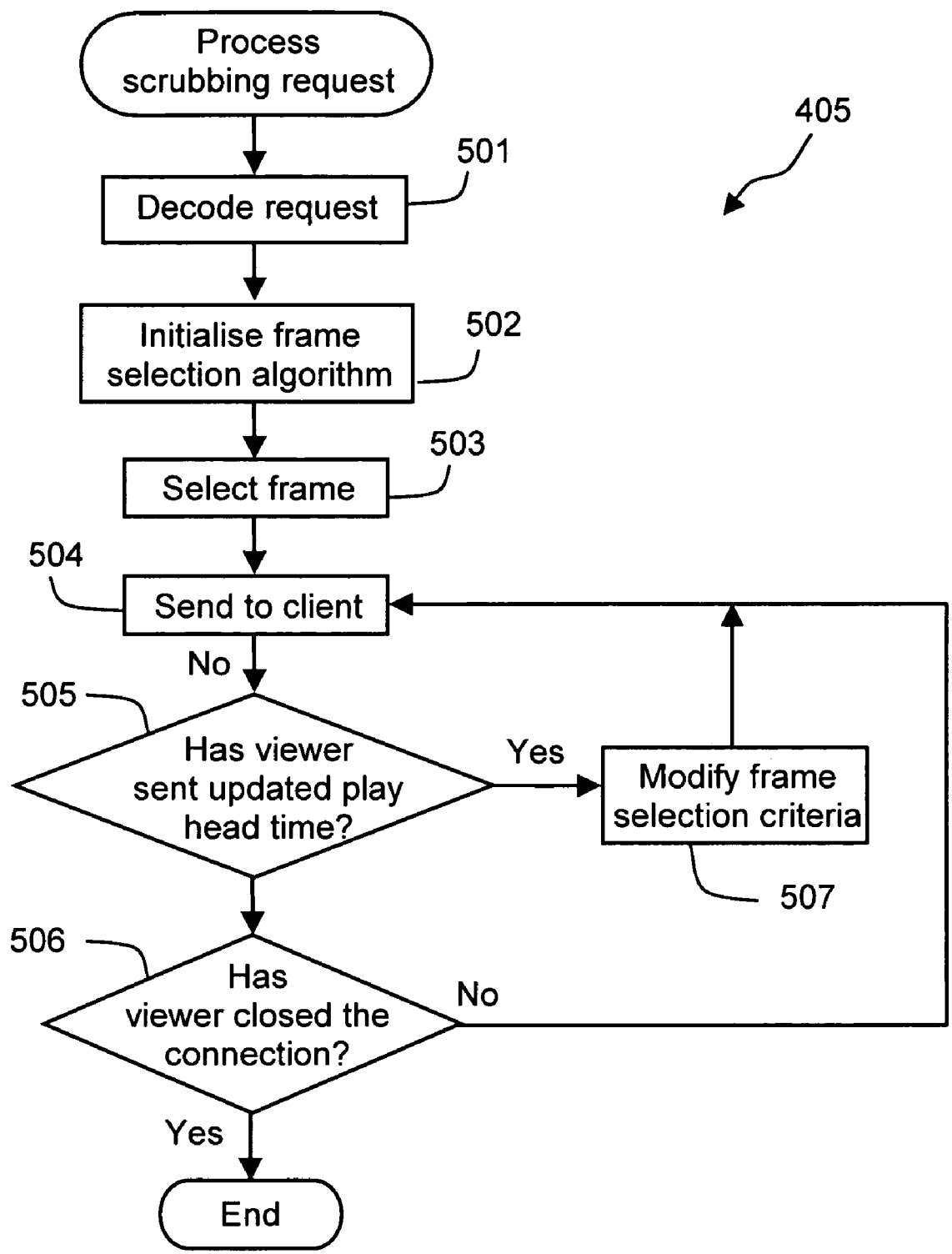
FIG. 5 is a flowchart of a method of processing a scrubbing request by the server application of FIG. 4.

The process in FIG. 5 is used if the (streaming) video request is a video scrubbing request. At step 501 the streaming server application 400 decodes the request and extracts the current play head time, the visible timeline range and the minimum granularity of the timeline. At step 502 the streaming server application 400 uses the data from the request to initialise a frame selection algorithm. At step 503 the streaming server 101 selects a frame from the available video using the frame selection algorithm. At step 504 the selected frame is read from the stored video and sent to the streaming client 103. At step 505 the streaming server 101 checks for a PlayheadPostion request from the client 103. If there has been no PlayheadPosition request then the server application 400 checks if the streaming client 103 has closed the connection at step 506, for example by the user shutting-down the GUI 106 in a traditional fashion.

If the streaming client 103 has not closed the connection at step 506 then the server 101 selects another frame to send to client 103 at step 503.

If the streaming client 103 has sent a PlayheadPosition at step 505 then the updated play head time and visible timeline information is used as modified input at step 507 to the frame selection algorithm.

4.0 Frame Selection Algorithm

The frame selection algorithm is used by the streaming server 101 when servicing scrubbing video requests from streaming clients 103. The algorithm is preferably a range based selection algorithm which in part relies on the even spread algorithm. In some implementations the even spread algorithm may be used exclusively as the frame selection algorithm.

In some implementations, the frame selection algorithm is run by the streaming client 103 instead of the streaming server 101. Here the streaming client 103 calculates which frames are to be cached and then sends one or more requests to the server 101 requesting frames at the given times.

In the following description, "edges" can refer to either the value for the extents of the video available or the value for range of the visible timeline as sent by the streaming client 103 to the streaming server 101.

4.1 Even Spread

The even spread algorithm is a simple method for picking frames that require very little processing power on the part of the server. The frame selection algorithm provides an even spread of frames to the streaming client.

Figure 6:
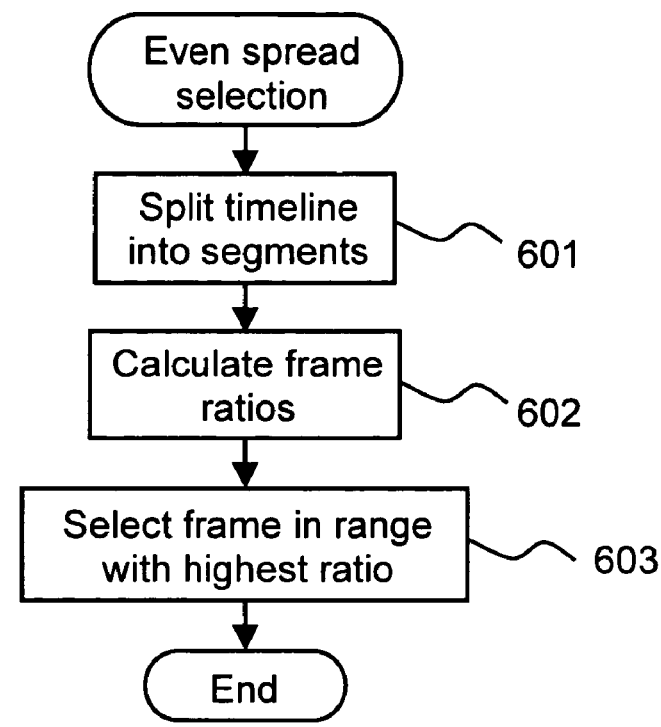
FIG. 6 is a flowchart of an even spread selection.

A procedure 400 for selecting a frame using the even spread algorithm is shown in FIG. 6. At step 601 the time line 202 is split into segments by dividing the timeline 202 at those points where frames have previously been sent and where the play head 203 is currently positioned. At step 602 the ratio of frames sent to timeline percentage is calculated. This is done by dividing the timeline range into two sections by splitting the timeline range at the current position of the play head 203. This generates two sections, $S_R$ and $S_L$, which each have a percentage of the timeline range. The section $S_R$ is the area of the timeline to the right side of the play head 203 (referred to as the right side) and $S_L$ is the area of the timeline to the left side of the play head 203 (refereed to as the left side). The number of frames sent in each section $S_R$, $S_L$ are counted and are designated $C_R$ and $C_L$. The ratio values are calculated as follows:

$$R_R = S_R * C_R$$

$$R_L = S_L * C_L$$

At step 603 a side of the timeline 202 around the play head split is chosen from which a segment is to be selected. This is done by firstly selecting the side with a zero ratio (ie. the side with no frames on it). If nether of the sides has no frames in it then the side with the lowest ratio is chosen. The frame that is selected is the frame that is the shortest time from the middle of the selected segment.

If both sides have the same ratio then step 603 is ignored for this iteration and the largest segment from either side is chosen.

Figure 13:
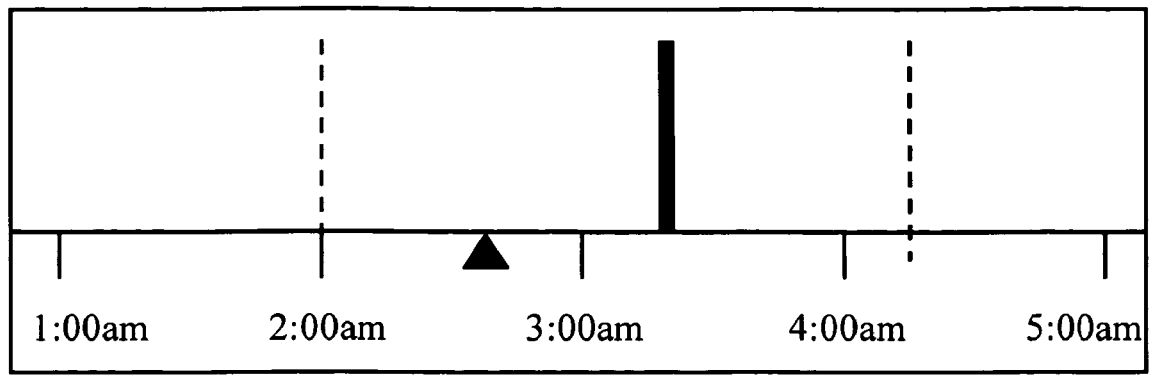
Figure 14:
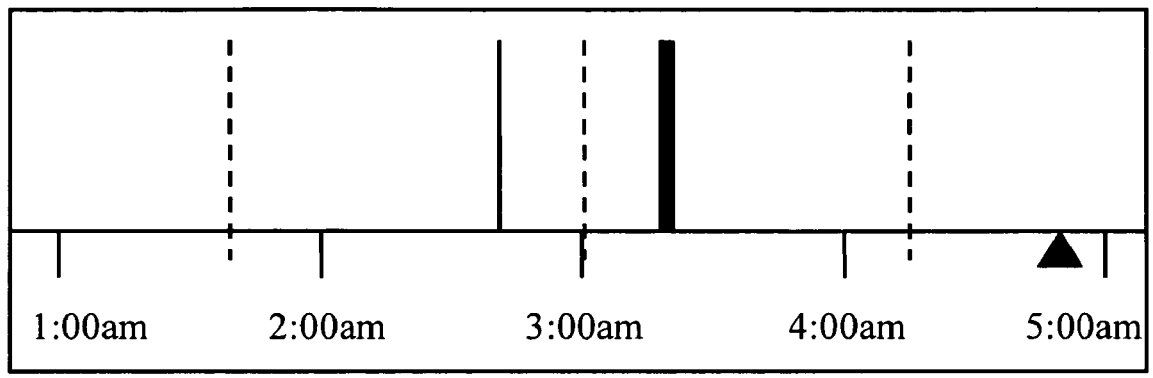
Figure 15:
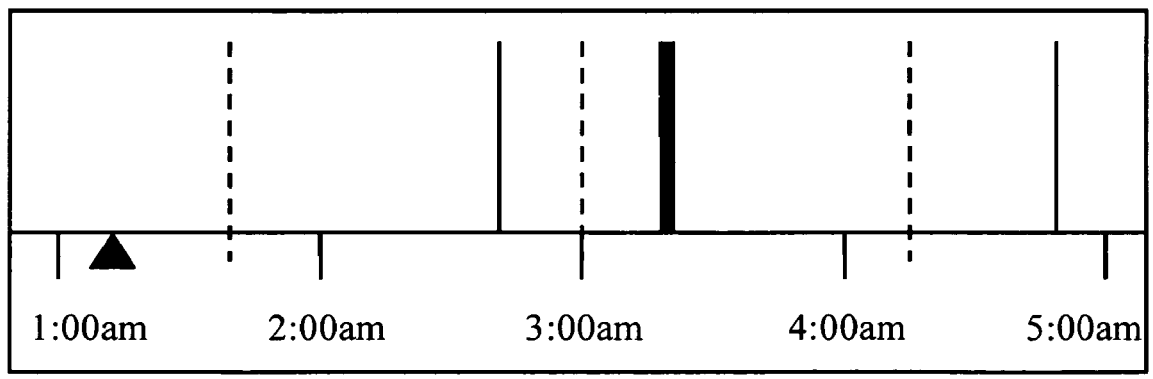

FIGS. 13 to 15 show three frames being selected by the even spread algorithm where the splits are shown with broken lines, the play head position is shown with a thick bar, the previously chosen frames are shown with thin bars, and the location of the frame that will be chosen in this iteration of the process is shown with a solid triangle.

FIG. 13 is the first step of the process where no frames have been sent so the timeline is divided into two sections by the play head 203. The frame that is selected lies at the point of the triangle which is in the larger of the two sections, and where the ratio of the two sides divided by the triangle is the same. These frames are those in the frame cache 104 and not those in the video stored on the server 102.

FIG. 14 shows the second iteration of the process where one frame has already been chosen, as indicated by the thin line at the position of the triangle of FIG. 13. In FIG. 14, the section to the right of the play head has no frames in it, as only one frame has been chosen and that frame is in the frame cache on the left side of the first split, so is chosen automatically. The frame that is sent is at the point of the triangle.

FIG. 15 shows the third iteration of the process where two frames have previously been sent, as indicated by the thin lines. As both sides have one frame in them, but the left side is slightly larger, then the left side is chosen. The frame is randomly selected from the two equal sized segments on that side.

4.2 Ranges

The ranges algorithm is a method of selecting frames based on dividing the timeline range around the current play head time into a series of overlapping ranges that span the current visible range and a short period before and after the visible range. The timeline range is divided into 4 regions on each side of the play head. The four range types are called close, mid, far and outside ranges and are defined to be the following:

- The close ranges are a static size of 10% of the total visible range each, and never extend outside the visible range. The close ranges extend from the play head time towards the edges of the visible ranges.
- The mid ranges are a flexible size. Their size is calculated by dividing the timeline in two at the point of the current play head position. The mid range in each half is from 15-75% of the remaining space, except they are extended to overlap with the close and far ranges if the calculated range doesn't overlap with the close and far ranges.
- The far ranges are a fixed size that extends from the boundaries of the visible range towards the play head and are 10% of the width of the visible range each.
- The outside ranges are a fixed size that extends 10% of the width of the visible range from the visible range but are outside of the visible range.

The ranges described above are a typical for a preferred implementation. Other ranges presenting different size calculations may be used according to the specifics of the implementation.

Figure 7:
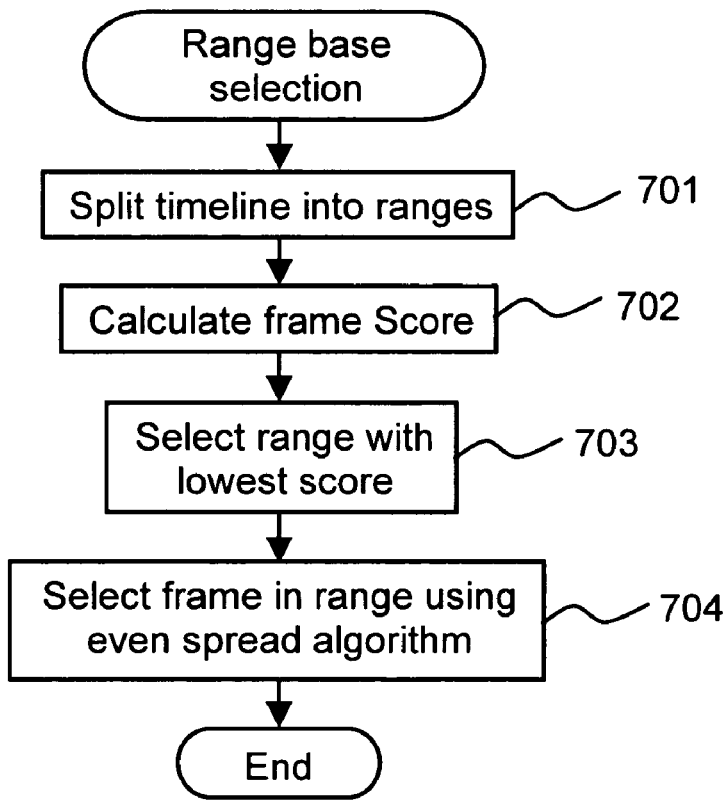
FIG. 7 is a flowchart of a range base selection.

A procedure 700 used to select a frame using the ranges method is shown in FIG. 7. At step 701 the timeline is split into ranges according to the rules described above. The calculated ranges can overlap. At step 702 the number of frames that have already been sent from the server 101 to the client 103 in each range are counted. If the ranges overlap at a point where frames have been sent, then those frames count towards all ranges in which the frames fall. The following formula is used to calculate the base score of each range:

$$S = C * W$$

where S is the score, C is the number of frames in that range that have already been sent to the client 103 and W is the weighting applied to that range. When calculating outside ranges, the count of frames is increased by 2 over the actual number of frames in the range. The weighting factors are as follows

| | |
|---|---|
| Close | 0.8 |
| Mid | 0.7 |
| Far | 1.0 |
| Outside | 2.0 |

This formula with the weightings given creates a spread of frames that is denser close to the current position of the play head 203 but still has enough frames to provide some feedback to the user at the edges of the visible timeline. If the user moves the play head 203 into one of the far ranges then less dense areas near the play head 203 will become the close ranges with very low scores and is rapidly filled with frames. The outside ranges are given a very low score as they are rarely needed and the timeline can only scroll a small period between PlayheadPosition updates.

The weighting factors are modified by the following factors:

If the last movement was small (10% of the timeline or less) then close ranges weighting is modified by −0.2. This weighting is applied on the assumption that the user is moving the play head slowly and the user is likely to want more frames close to the play head 203 in the immediate future.

The weighting on all ranges on the same side as the last update of the play head have the weighting modified by −0.2. This weighting is applied on the assumption that the user is more interested in frames on the same side of the play head as the last movement.

If the play head is within 5% of the edge of the visible timeline then the outside range at that edge of the timeline range has the weighting modified by −1.0. This weighting is applied on the assumption that the user is more likely to scroll the off the currently visible timeline in when the current play head time is near the edge of the visible timeline.

FIG. 16 shows an example set of ranges for the given timeline visible range and play head position.

At step 703 the range with the lowest score is chosen to be the range from which the frame is chosen. If the scores are then the same, then one of the lowest scoring ranges is chosen at random. At step 704 a simplified even spread algorithm is used to select a frame to be sent from the range that was selected. The range is divided up into segments in the same way as with the even spread algorithm and the frame that is sent is the frame that is closest to the middle of the largest segment.

5.0 Protocol Description

The following protocol is used to request video from the streaming server 101. There are three commands that are typically part of the protocol. A GetVideo command to request streaming video, GetScrubbingVideo command to request a scattering of frames while the user is scrubbing the play head 203, and a PlayheadPosition command to inform the streaming server 101 of the updated play head position.

The protocol used is typically layered on top of Hyper Text Transfer Protocol (HTTP). Each request is a separate HTTP request. The parameters to the command are specified as standard HTTP parameters as specified in the HTTP/1.1 standard RFC 2616.

5.1 Time formats used in the protocol

These are the time and time range formats used in the protocol.

Figure 12:
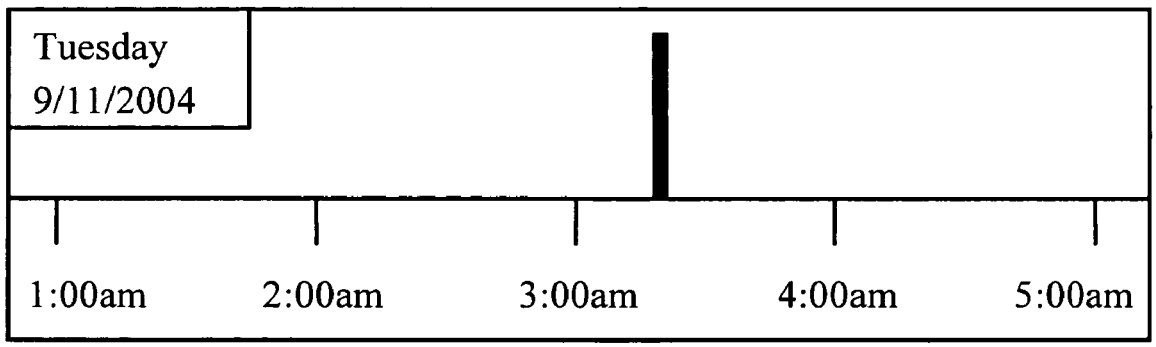

In a preferred implementation the timeline represents a continuous period of time as shown in FIG. 12. The time and date format used in the system is:

YYYYMMDD$_{13}$HHNNSSUUU where:
YYYY is the four digit year;
MM is the one based month (ie, January is the month 01);
DD is the one based day (ie, the first day of the month is represented as 01);
HH is the hour of the day in 24 hour time, having a range 00-23;
NN is the minute of the hour, having the range 00-59
SS is the second of the minute, having the range 00-59; and
UUU is the millisecond of the second, having the range 000-999.

This format is used when a specific instant is being referred to such as the time of a frame. This is also called a time point.

When a time range is being referred to, the following format is used.

<time 1>_<time 2> where:
<time 1> is the start time of the range as specified above.
<time 2> is the end time of the range as specified above.

Figure 11:
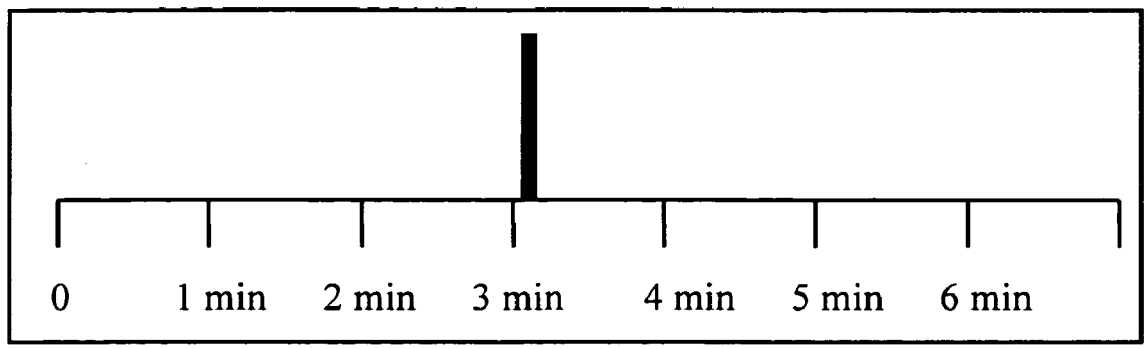
FIGS. 11 to 16 show timelines for various playback situations.

In an alternative implementation, the time is specified as an offset from the beginning of the available video. FIG. 11 shows the timeline as typically presented to the user in this implementation. This implementation will typically be used when the server 101 is providing access to a single file or a group of discrete file such as movie trailers. The format of the time is typically:

HHMMSSUUU where:
HH is the number of whole hours;
MM is the number of minutes into the last hour;
SS is the number of seconds into the last minute; and
UUU is the number of milliseconds into the last second.

In this implementation time ranges are specified as follows:

<offset 1>_<offset 2> where:
<offset 1> is the start time of the range.
<offset 2> is the duration of the range.

5.2 Video Requests

Video requests are made by the client 103 and configured as a call under HTTP in the following format:

http://<host_or_ip>:<port>/GetVideo?<parameters>.

The components of the video request may now be described under the protocol.

5.2.1 host_or_ip host or ip is either the Internet Protocol (IP) address of the streaming server or the symbolic host name of the streaming server.

5.2.2 port

Port is the port number upon which the streaming server 101 is listening for incoming connections.

5.2.3 GetVideo

This is the command under the present protocol that is issued to the streaming server 101. This command is used to request a video stream from the server 101.

5.2.4 Parameters

These are the parameters to the GetVideo command. Typically these would contain information such the time range of the request, and information identifying which video the client is requesting.

(i) request_time or request_time_range
This is the time the streaming client 103 is requesting from the server 101. It can be a time or a time range. A single time specifies that the server 101 streams from that time to the end of the video. A time range requests a smaller time range from the available video.

(ii) resource_id
This parameter specifies the resource on the server 101 that the streaming client 103 is requesting. This is typically the file name or stream identifier depending on the type of video stream that is being served.

5.2.5 Response

A typical format of the response to a GetVideo request is a series of video blobs. In each video blob, the field blob_length specifies the total length of the video blob including the time and the video frame. Each blob has a type which identifies the format of the blob. For a video blob, the type is VIDEO_BLOB. Each video blob contains a time which is the time of the frame that is part of the blob. The last block of data in the video blob is the frame to be displayed. The frames will typically be in chronological order.

5.3 Scrubbing Video Requests

This is the protocol used to request a frame scattering stream from the streaming server 101 by the streaming client 103. The protocol is typically layered on top of HTTP in the same way as usual streaming video requests, using the format:

```
http://<host_or_ip>:<port>/
    GetScrubbingVideo?<parameters>
```

5.3.1 host_or_ip host or ip is either the Internet Protocol (IP) address of the streaming server 101 or the symbolic host name of the streaming server 101.

5.3.2 port

Port is the port number upon which the streaming server 101 is listening for an incoming connection.

5.3.3 GetScrubbingVideo

GetScrubbingVideo is the command that is being issued to the streaming server 101. This command is requests a scrubbing video stream from the server.

5.3.4 Parameters

These are the parameters to the GetScrubbingVideo command.

(i) resource_id

This parameter specifies the resource on the server 101 that the streaming client 103 is requesting. This is typically the file name or stream identifier depending on the type of video stream that is being served.

(ii) current_time

This parameter specifies the time represented by the play head on the client at the time this request was made. It is specified as a time point.

(iii) visible_range

This parameter specifies the visible time range of the client at the time of the request. It is specified as a time range. In some embodiments it is optional and defaults to all the available video.

(iv) minimum_scrubbing_granularity

This parameter specifies the minimum discernable distance between times in the streaming client. If not specified the streaming server assumes that all frames can be distinguished.

In some implementations the GetScrubbingVideo command may have a list of times as an optional parameter. This allows the client 103 to specify which frame times should be sent as part of the request. In these implementations the streaming server 101 simply sends the requested frames to the client 103. Typically no frame selection is performed by the server 101 in these implementations.

5.3.5 Response

A typical format of the response to a GetScrubbingVideo request is a series of video blobs. In each video blob, the field blob_length specifies the total length of the video blob including the time and the video frame. Each blob has a type which identifies the format of the blob. For a video blob, the type is VIDEO_BLOB. Each video blob contains a time which is the time of the frame that is part of the blob. The last block of data in the video blob is the frame to be cached by the client 103. The frames will typically not be in chronological order (ie. they will generally be non-contiguous).

The streaming client 103 desirably caches all frames sent by the streaming server 101 in a manner that allows quick seeking to the closest frame given the current time of the play head 203 as the user moves the play head 203.

An additional HTTP header is returned as part of the response from the streaming server 101 which contains the request id that identifies the request to which the response corresponds. This identifier is used to identify the frame scattering request when issuing an update position command to the streaming server 101. The additional HTTP header is in the standard HTTP header format with a key of "connection-id" and the value is the connection id as a decimal unsigned integer.

5.4 Update Position Request

In a preferred implementation, the GUI 106 periodically sends the current play head time to the streaming server 101. The period of the updates can be time based, only when the play head position changes, or a combination of both. The streaming server 101 can then modify which frames are sent to the GUI 106 based on the updated play head time. Such a request has the format:

```
http://<host_or_ip>:<port>/
    PlayheadPosition?<parameters>
```

5.4.1 host_or_ip host or ip is either the Internet Protocol (IP) address of the streaming server 101 or the symbolic host name of the streaming server 101.

5.4.2 port

Port is the port number upon which the streaming server 101is listening for an incoming connection.

5.4.3 PlayheadPosition

PlayheadPosition is the command that is being issued to the streaming server 101. This command operates to inform the streaming server 101 of the current play head position.

5.4.4 Parameters

The parameters of an update position request are as follows:

(i) connection_id

This parameter is the connection-id returned by the GetScrubbingVideo command.

(ii) current_position

This parameter specifies the updated position of the play head 203 on the timeline 202 of the GUI 106 executing upon the client 103 and is specified as a time point. Both current_Position and visible_range can be specified in the one request.

(iii) visible_range

This parameter contains the update visible range of the timeline 202 if it has changed since the last update. Both current_position and visible_range can be specified in the one request.

5.4.5 Response

The response is a standard HTTP reply with no extra data.

5.5 Protocol Summary

A video scrubbing request is sent from the GUI 106 to the streaming server 101 indicating that the user is starting to drag the play head 203. This request may contain extra information about the user's action and the GUI 106 being presented to the user. For instance the request will contain in a preferred implementation, the current time of the play head 203, the visible region of the timeline 202 (ie. the region to which the user can directly move the play head 203 without scrolling) and the minimum granularity of the movement of the play head 203. The minimum granularity may be calculated as the smallest time that can be differentiated by dragging the play head 203. An example of this is the period of time represented by one pixel at the current zoom level of the timeline 202. This can be used to optimise all frame selection algorithms as the frame selection algorithm does not need to guess what is the minimum distance between two frames that a user can select.

The streaming server 101 in response to the scrubbing request returns sample frames to the client 103. The sample frames are determined using one of the algorithms described above and, in the most general case, represent frames selected at a range of locations (ie. times) in the video source. The frames may be considered almost as being randomly sampled from the source, although it will be appreciated that the use of the algorithms provides some intuition to the sampling. Nevertheless, the sample frames are generally non-contiguous.

The GUI 106 caches the sample frames and the times of the sample frames sent by the server 101, either in memory (eg. the RAM 1706) or on a secondary storage medium (eg. the HDD 1710). When the user moves the play head 203, the GUI 106 then selects that sample frame from the cache 104 that is closest in time to the current position of the play head 203 and that sample frame is then displayed in the GUI window 201. Whilst the frame closest to the current play head position is desirably selected, other frames associable with that position may also or alternatively be selected. This, for example, may permit the GUI 106 to display the two-closest frames, or the four closest frames at least two of which precede and two following the current play head position.

In some implementations the GUI 106 will then send a message to the streaming server 101 informing the streaming server 101 of the updated position of the play head 203. This permits the algorithms the ability to better select sample frames for return to the client 103.

6.0 Extensions

Other information that is available to the streaming server 101 may be used to modify the basic approach used to select frames. The following modified situations can be used to enhance the above approaches to provide a generally more useful spread of frames.

6.1 Event Modifications

A number of streaming video systems have extra data that indicate areas that are of particular interest to a user viewing the stored video. An example of such a system is a video surveillance system that can record events such as doors opening in a building.

The events can be used in any of the above approaches to increase the likelihood of frames being sent around the events as these represent areas of increased interest or importance in the stored video.

Events are used in the even spread algorithm by increasing the size of segments that contain events. At step 603 in FIG. 6, for every event in a segment, the segment size is increased. This increases the likelihood of choosing that segment. An alternative is to choose a frame close to the event in preference to sending frames that are in the middle of a segment.

Range algorithms are based on the even spread algorithm for choosing a frame and use the same method for integrating events.

Another approach to using extra information about the video stream is a streamed movie where the scene cuts in the movie are indexed for direct access. Each of the index points is used as an event is in the above description.

6.2 Periods of "no video" modifications

In some video streaming systems it is normal to have periods where there is no video present. An example of this is a video surveillance system that does not always record.

Implementations of the above described video scrubbing with this attribute can have an additional frame type that marks a period of time as a period where there is no video. These frames are typically sent to the client 103 at irregular intervals as the streaming server 101 discovers periods of "no video" in the stored video. Alternative arrangements may send all the "no video" blocks in the visible range of the timeline 202 as the first data sent to the client 103 and then send additional no video blocks as the visible range changes.

An example of a format of a No_Video_Blob useful in these implementations is specified in FIG. 9. The format is the same as a Video_Blob (ie. FIG. 8) except that instead of a frame time and an image, the No_Video_Blob of FIG. 9 contains a start_time field representing the start time of the "no video" period, and an end_time field representing the end time of the "no video" period.

Once the streaming server 101 is aware of the period of "no video" it will modify the approach used to choose frames to take advantage of the periods of "no video".

The even spread algorithms described above can use the no video regions as an initial set of splits where the periods of "no video" are assigned the lowest possible value to prevent them from ever being the segment that is chosen for the selection of a frame. The algorithm then splits the other segments in the manner previously described.

Range based algorithms will modify the selection to reduce the score of a range by the percentage of the range that is covered by "no video". The final score for a range is given by the equation:

$$S_F = S_I * (1-P)$$

where:

$S_F$ is the final score given to a range;

$S_I$ is the score given to a range without the percentage of the range covered by no video regions; and P is the fraction of the range in the range of 0 to 1.0 that is covered by periods of "no video".

The final stage of the range based algorithm uses the same enhancements as the even spread algorithm when dealing with no video regions.

6.3 Frame expiring

Due to the continuous nature of the client application 300, it is possible that the client 103 could run out of usable memory (eg. 1706 and 1710) forming the cache 104 when caching the frames sent from the server 101. To deal with this possibility, either the client 103 or the server 101, or both, may inform the other that they have removed (or expired) frames from their cache or from consideration by the frame selection algorithm. For example, it is unlikely that the client 103 will need to retain frames that are a long way (ie. distanced in time) from the current visible range. It is reasonable to expect that these frames could be removed from the cache 104 with little impact on the effectiveness of the system 100.

6.3.1 Client Expiring

The client 103 can operated to expire frames from its cache 104 with this method. This is useful if the client 103 has limited memory and no longer has room for all the frames sent by the server 101. To expire frames the client 103 typically sends the server 101 an expire command with the connection identifier of the stream from which the frames have been cached. Once the client 103 has sent this command, the server 101 operates to remove all frames listed from the list of frames that have previously been sent to the client 103. The server 101 may resend these frames again if the frame selection algorithm picks them again. The format for a client expiring frames command is as follows:

http://<host_or_ip>:<port>/
    ExpireFrames?<parameters>

6.3.2 host_or_ip host or ip is either the Internet Protocol (IP) address of the streaming server 101 or the symbolic host name of the streaming server 101.

6.3.3 port

Port is the port number upon which the streaming server 101 is listening for an incoming connection.

6.3.4 ExpireFrames

ExpireFrames is the command that is issued to the streaming server 101. This command is requests a removal of frames from the list stored by the server 101.

6.3.5 Optional parameters

The parameters of this request are as follows:
(i) connection_id
  This parameter is the connection-id returned by the GetScrubbingVideo command.
(ii) frames
  This parameter is a list of comma separated times of the frames the client has removed from the cache 104.

6.3.6 Server Expiring

The server 101 can expire one or more frames from the list of frames the client 103 has cached. This is used to reduce the number of frames that needs to be considered by the frame selection algorithm when selecting a new frame to send. The client 103 is free to ignore this message and continue to cache the frames specified. The server 101 may resend the specified frames at a later time.

The server 101 specifies a frame to expire by sending an Expire_Blob to the client 103 on the video stream. An example of this is seen in FIG. 10 and is noted that an Expire_Blob has the same form as a Video_Blob (FIG. 8) except the type field is different and there is no image data in the blob.

6.4 Timeline scrolling

In further implementations, the streaming client 103 may have the ability to scroll the visible part of the timeline 202 while the user is dragging the play head 203 and that the rate at which the timeline scrolls is predictable by the streaming client 103. In these implementations, the frame selection algorithm can be modified to efficiently deal with the moving visible timeline range. The streaming server 101 does this by deviating from the usual frame selection algorithm and sending a frame specifically selected to be near the future position the play head 203 once the timeline 202 has scrolled. These substitute frames are called "timeline scrolling frames".

An additional parameter is added to the PlayheadPosition command. The parameter specifies the rate of change for the timeline if the user continues to scroll the timeline. This extra parameter is called rate_of_change and is specified as the duration of the timeline that passes per second of scrolling. This parameter is present when the timeline 202 is being scrolled while the user is dragging the play head 203, with associated mouse 1703 for example, in the streaming client 103.

The rate_of_change parameter is used to modify the frame selection algorithm to choose a frame that is close to the anticipated location of the play head 203 if the user continues to scroll the timeline 202.

The streaming server 101 must also choose the update period at which it will send the timeline scrolling frames. Typically this may be four times per second although other values can be chosen depending on expected network bandwidth and the processor load of the streaming server 101.

Figure 18:
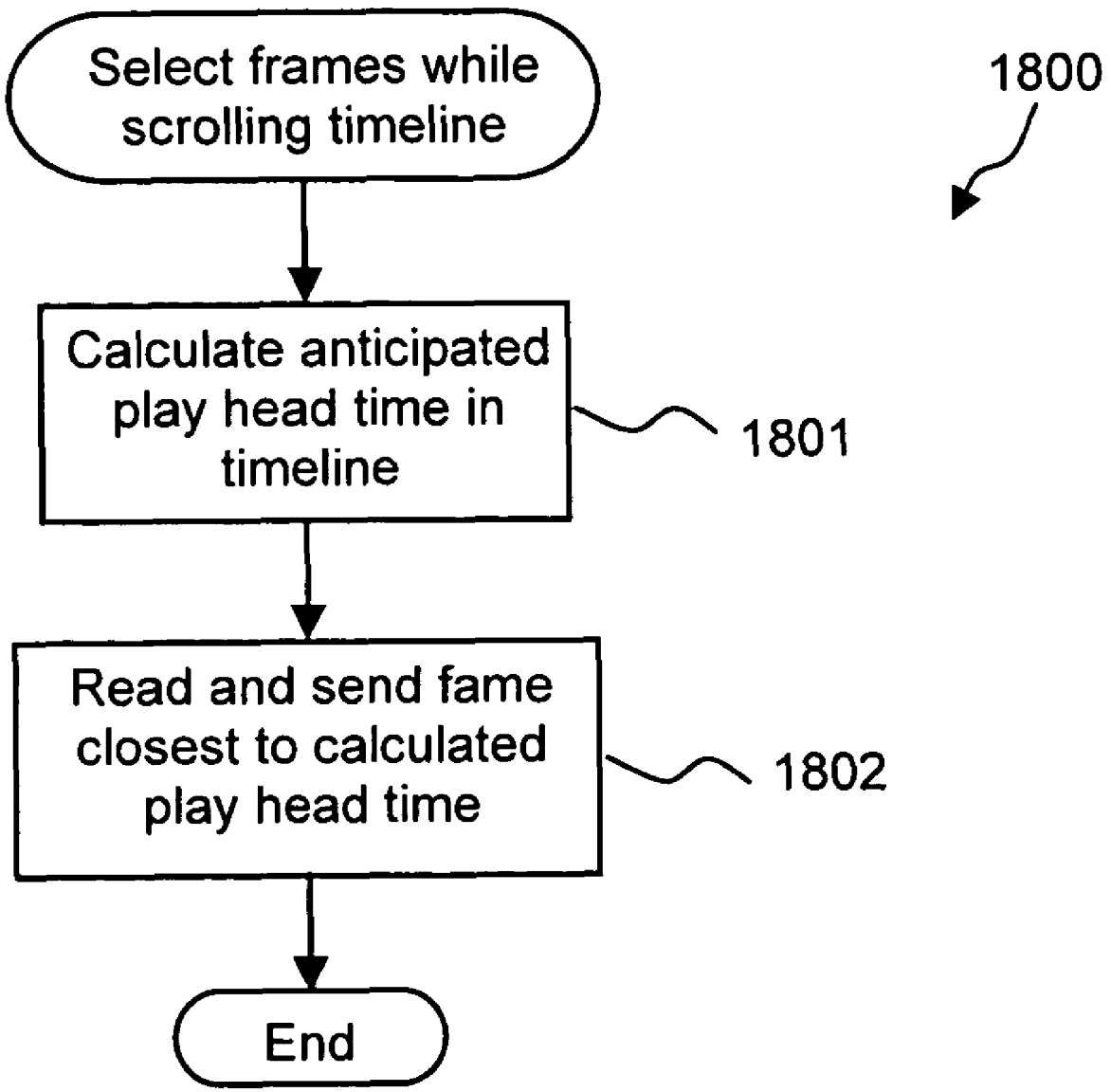
FIG. 18 is a flowchart for anticipating the play head position when scrolling the timeline.

A method 1800 is used by the server 101 to select frames when the user is scrolling the timeline is shown in FIG. 18. Step 1801 operates to calculate the anticipated play head time from the play head time and the rate-of-change given in the PlayheadPosition request. The rate-of-change value is multiplied by the period of time the timeline scrolling frames are being sent using the following formula:

$$A = P + (R * U)$$

where:
  A is the anticipated time of the next scrolling frame.
  P is the time given in the PlayheadPosition request or the previous anticipated time if there hasn't been a PlayheadPosition request since the last time the anticipated time was calculated;
  R is the rate of change given in the PlayheadPosition request; and
  U is the update period for the timeline scrolling frames.

The anticipated frame time is calculated once every timeline scrolling send period and may be based off the last anticipated frame time instead of a PlayheadPosition request time if no PlayheadPosition request has been received since the last calculated anticipated frame time.

Step 1802 then operates to read and send the frame closest to the anticipated frame time.

INDUSTRIAL APPLICABILITY

The arrangements described are applicable to video streaming and image processing industries, particularly where scrubbing of digitally recorded unedited video is desired to manually identify certain scene events.

The foregoing describes only some embodiments of the present invention, and modifications and/or changes can be made thereto without departing from the scope and spirit of the invention, the embodiments being illustrative and not restrictive.

I claim:

1. A method of displaying a video on a display device, said method comprising the steps of:
    detecting a position of a play head on a timeline, the timeline having a timescale and being associated with a display of the video on the display device;
    splitting the timeline into a plurality of ranges based on the detected position of the play head, the plurality of ranges including a close range within which is the detected position of the play head and a second range beyond the close range, wherein the close range is a static percentage of a total visible range of the timeline, and wherein the second range is beyond the close range but within the visible range of the timeline; and
    caching for display on the display device, a plurality of non-contiguous sample frames of the video, wherein a non-contiguous sample frame is selected for caching based on a relation between a range in which the non-contiguous sample frame is located and the detected position of the play head such that a spread of frames in the close range is denser than a spread of the frames in the second range.

2. A method according to claim 1, wherein the caching of the plurality of non-contiguous sample frames continues during an interaction with the play head on the timeline.

3. A method according to claim 1, wherein the plurality of non-contiguous sample frames are selected using a statistical distribution associated with the interaction with the play head on the timeline.

4. A method according to claim 1, wherein the plurality of non-contiguous sample frames are selected using a fixed distribution pattern associated with the interaction with the play head on the timeline.

5. A method according to claim 1, wherein the plurality of non-contiguous sample frames are selected using a calculated priority of the plurality of ranges associated with the interaction with the play head on the timeline.

6. A method according to claim 1, wherein the sample frames are selected from a portion of the video.

7. A method according to claim 1, wherein the video from which the sample frames are cached has at least one region of no video.

8. A method according to claim 7, wherein said caching further comprises not caching the region of no video.

9. A method according to claim 7, wherein a no-video indication is cached in the region of no video.

10. A method according to claim 1, wherein the selection of the sample frame utilizes a minimum inter-sample frame distance.

11. A method according to claim 1, wherein the caching gives higher weighting of caching a non-contiguous frame if the position of the range is closer to the play head.

12. A method according to claim 1, wherein the plurality of non-contiguous sample frames are selected from the plurality of ranges at a fixed distance in time from a current sample frame associated with the play head.

13. A method according to claim 1, wherein the plurality of ranges are each defined by a start time of the range and an end time of the range or by a designated time of the range and a duration of the range.

14. A non-transitory computer readable storage medium having a client application stored thereon, the client application being executable on a computer for causing the computer to display on a display device coupled to the computer a video retrieved over a network from a server, said client application comprising:
 a graphical user interface including a reproduction portion for display of said video and a timeline having a timescale and being associated with a display of the video on the reproduction portion and, during an interaction with a play head on the timeline:
  (i) forms a request for the video to be supplied from the server;
  (ii) sends the request to the server;
  (iii) determines a position of the play head;
  (iv) splits the timeline into a plurality of ranges based on the determined position of the play head, the plurality of ranges including a close range within which is the detected position of the play head and a second range beyond the close range, wherein the close range is a static percentage of a total visible range of the timeline, and wherein the second range is beyond the close range but within the visible range of the timeline;
  (v) receives a plurality of non-contiguous sample frames of the video from the server in response to the request, wherein a non-contiguous sample frame is received based on a relation between a range in which the non-contiguous sample frame is located and the detected position of the play head such that a spread of frames in the close range is denser than a spread of the frames in the second range; and
  (vi) displays at least one of the received sample frames in the reproduction portion.

15. A non-transitory computer readable storage medium according to claim 14, wherein the interaction comprises a selection, hold and de-selection operation of the graphical user interface.

16. A non-transitory computer readable storage medium according to claim 14, wherein said receiving further comprises caching the sample frames and said displaying comprises selecting for display at least one of the cached sample frames.

17. A non-transitory computer readable storage medium having a server application stored thereon, the server application being executable on a computer for causing the computer to deliver a video over a network to a client for display on a display device, said server application comprising:
 code for receiving a request for video from the client during an interaction by the client with a play head on a timeline having a timescale;
 code for determining a position of the play head;
 code for splitting the timeline into a plurality of ranges based on the determined position of the play head, the plurality of ranges including a close range within which is the detected position of the play head and a second range beyond the close range, wherein the close range is a static percentage of a total visible range of the timeline, and wherein the second range is beyond the close range but within the visible range of the timeline;
 code for selecting a plurality of non-contiguous sample frames of the video from a video source, wherein a non-contiguous sample frame is selected based on a relation between a range in which the non-contiguous sample frame is located and the detected position of the play head such that a spread of frames in the close range is denser than a spread of the frames in the second range; and
 code for transmitting the plurality of non-contiguous sample frames to the client.

18. A non-transitory computer readable storage medium according to claim 17, wherein said code for selecting utilizes one of an even spread selection or a range base selection of frames associated with at least one timeline parameter derived from the request.

19. A non-transitory computer readable storage medium having a computer program stored thereon and executable upon a computer for causing the computer to retrieve a video over a network for display on a display device, said program comprising:
 code for detecting a position of a play head on a timeline, the timeline having a timescale and being associated with a display of the video on the display device;
 code for splitting the timeline into a plurality of ranges based on the determined position of the play head, the plurality of ranges including a close range within which is the detected position of the play head and a second range beyond the close range, wherein the close range is a static percentage of a total visible range of the timeline, and wherein the second range is beyond the close range but within the visible range of the timeline; and
 code for caching for display on the display device a plurality of non-contiguous sample frames of the video, wherein a non-contiguous sample frame is selected for caching based on a relation between a range in which the non-contiguous sample frame is located and the detected position of the play head such that a spread of frames in the close range is denser than a spread of the frames in the second range.

20. A non-transitory computer readable storage medium according to claim 19, wherein said program further comprises:
 code for selecting, according to the interaction, at least one of the cached sample frames for display.

* * * * *